US009958888B2

(12) United States Patent
Wei et al.

(10) Patent No.: US 9,958,888 B2
(45) Date of Patent: May 1, 2018

(54) PRE-CHARGE TECHNIQUE FOR A VOLTAGE REGULATOR

(71) Applicant: Silicon Laboratories Inc., Austin, TX (US)

(72) Inventors: Dazhi Wei, Austin, TX (US); Gang Yuan, Austin, TX (US); Erik Pankratz, Austin, TX (US); Imranul Islam, Austin, TX (US); Praveen Kallam, Austin, TX (US); Axel Thomsen, Austin, TX (US); Kenneth Wilson Fernald, Austin, TX (US); Jinwen Xiao, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 163 days.

(21) Appl. No.: 14/740,386

(22) Filed: Jun. 16, 2015

(65) Prior Publication Data

US 2016/0370816 A1    Dec. 22, 2016

(51) Int. Cl.
  G05F 1/575    (2006.01)
  G05F 1/56     (2006.01)
  H02M 3/158    (2006.01)

(52) U.S. Cl.
  CPC ............... *G05F 1/575* (2013.01); *G05F 1/56* (2013.01); *H02M 3/1588* (2013.01); *Y02B 70/1466* (2013.01)

(58) Field of Classification Search
  CPC ...... H02M 1/36; H02M 3/1588; H02M 3/156; H02M 2001/0025; H02M 1/08; H02M 2001/0009; H02M 2001/0032; H02M 3/158; H02M 3/1584; Y02B 70/1466; Y02B 70/16; G05F 1/10; G05F 1/573; G05F 1/575
  See application file for complete search history.

(56) References Cited

U.S. PATENT DOCUMENTS 4,375,595 A    3/1983    Ulmer et al.
4,896,094 A    1/1990    Greaves et al.
(Continued)

OTHER PUBLICATIONS

Silicon Labs, "Silicon Labs Launches Blue Gecko Bluetooth Smart Solutions," Feb. 23, 2015, 4 pages.
(Continued)

*Primary Examiner* — Henry Lee, III
(74) *Attorney, Agent, or Firm* — Trop, Pruner & Hu, P.C.

(57) ABSTRACT

In one embodiment, an apparatus includes a controller to control a voltage regulator. The controller may have a first comparator circuit to compare a first reference voltage to a feedback voltage. In turn, the first comparator circuit may include: a first comparator having a first input terminal to receive the feedback voltage and a second input terminal to receive the reference voltage and an output node to output an error signal based on the comparison; and a first pre-charge circuit coupled between the first input terminal and the output node configured to pre-charge a first portion of a compensation network to a pre-charge level. The first controller may further include a second comparator circuit coupled to the first comparator circuit compare the error signal to a ramp signal and to generate a first control output to control a power train of the voltage regulator in a first mode of operation.

18 Claims, 5 Drawing Sheets

(56) References Cited

U.S. PATENT DOCUMENTS

| | | | |
|---|---|---|---|
| 5,059,820 A | 10/1991 | Westwick | |
| 9,270,190 B2* | 2/2016 | Ganesh Kumar | H02M 3/33553 |
| 2007/0216372 A1* | 9/2007 | Weng | H02M 3/156 323/222 |
| 2009/0243564 A1* | 10/2009 | Kajita | G01R 19/16542 323/234 |
| 2012/0086423 A1* | 4/2012 | Dao | H02M 1/36 323/285 |

OTHER PUBLICATIONS

Junko Yoshida, Silicon Labs First Salvo in IoT SoCs: Blue Gecko, EE Times, Feb. 24, 2015, 3 pages.
U.S. Appl. No. 14/627,159, filed Feb. 20, 2015, entitled "Bias Circuit for Generating Bias Outputs," by Pavel Konecny.
U.S. Appl. No. 14/549,910, filed Nov. 21, 2014, entitled "Image Rejection Calibration With a Passive Network," by John M. Khoury.
wikipedia.org, "Bandgap Voltage Reference," Jan. 17, 2015, 5 pages.

* cited by examiner

PRE-CHARGE TECHNIQUE FOR A VOLTAGE REGULATOR

BACKGROUND

Many integrated circuits include a variety of different components or logic blocks, some of which can be enabled at all times, others of which may periodically be enabled for activity and then placed into a low power mode. Further, the integrated circuit itself may at times be placed into a low power mode to reduce power consumption, particularly in a portable device.

Some integrated circuits include an on-chip voltage regulator (or are coupled to an off-chip voltage regulator). In either case, different control mechanisms for the voltage regulator may be used to maintain appropriate voltage levels depending on an activity state of the integrated circuit. However, switching between the different modes can be a relatively complex and time consuming event.

SUMMARY OF THE INVENTION

In one aspect, an apparatus includes a first controller to control a voltage regulator. The first controller may have a first comparator circuit to compare a first reference voltage to a feedback voltage. In turn, the first comparator circuit may include: a first comparator having a first input terminal to receive the feedback voltage and a second input terminal to receive the reference voltage and an output node to output an error signal based on the comparison; and a first pre-charge circuit coupled between the first input terminal and the output node, where the first pre-charge circuit is configured to pre-charge a first portion of a compensation network to a pre-charge level. The first controller may further include a second comparator circuit coupled to the first comparator circuit to compare the error signal to a ramp signal and to generate a first control output to control a power train of the voltage regulator in a first mode of operation.

In an example, the apparatus further includes a second controller coupled to the first controller, which may be configured as a low power controller to control the power train in a second mode of operation corresponding to a low power mode of operation and the first mode of operation corresponding to an active mode of operation.

Another aspect is directed to a method including: identifying a transition of a device from a low power mode to an active mode; responsive to identifying the transition, controlling a state of a first set of switches of a first controller of a voltage regulator to be open and controlling a state of a second set of switches of the first controller to be closed; initiating a pre-charge of a compensation network of the first controller, and pre-charging the compensation network to a predetermined state; and after pre-charging the compensation network to the predetermined state, causing the first controller to control the voltage regulator in place of a second controller of the voltage regulator.

In one example, pre-charging the compensation network includes: placing a first voltage level on a first polarity of a first capacitor and a first polarity of a second capacitor, the first voltage level corresponding to an offset voltage of a second comparator of the first controller; placing a second voltage level on a first portion of a second polarity of the first capacitor and a first portion of the second polarity of the second capacitor, the second voltage level corresponding to a reference voltage level; and placing a third voltage level on a second portion of the second polarity of the first capacitor and a second portion of the second polarity of the second capacitor, the third voltage level corresponding to a ground voltage level.

A still further aspect is directed to an integrated circuit having: a sensor circuit to sense information; a radio circuit to wirelessly transmit at least some of the sensed information; and a voltage regulator to provide a regulated voltage to the sensor circuit and the radio circuit. The voltage regulator may include: a power train having one or more first power switches to be controllably coupled between a first voltage node and a switching voltage node and one or more second power switches to be controllably coupled between the switching voltage node and a second voltage node, the power train to output the regulated voltage; and a first controller to control the power train in a first mode of operation corresponding to an active mode of operation. In turn, the first controller may include: a compensator having a first input terminal to receive the regulated voltage and a second input terminal to receive a reference voltage and an output node to output an error signal based on a comparison, the compensator including a compensation network to be pre-charged to a pre-charge level when the first controller is to be enabled; and a comparator circuit coupled to the compensator, the comparator circuit to compare the error signal to a ramp signal and to generate a first control output to control the power train in the first mode of operation. The voltage regulator may further include a second controller to control the power train in a second mode of operation, where the second mode of operation corresponds to a low power mode of operation.

DETAILED DESCRIPTION

In various embodiments, a control mechanism is provided for a voltage regulator to enable reduced delay in switching control of the voltage regulator from one mode of operation to another mode of operation. More specifically, embodiments provide techniques to enable an efficient pre-charge operation to be performed for components of a given controller of the voltage regulator, to enable a fast wake up of circuit blocks within a device to be powered up from a low power state. Still further, embodiments provide for control of a voltage regulator in an efficient and low power manner, to reduce power consumption in cases where the voltage regulator is implemented on-chip, such as within a low power integrated circuit. Using embodiments described herein, start up time during a mode transition from a low power mode to a low noise mode for a switching regulator can be reduced. This fast transition time from low power mode (e.g., a sleep mode) to an active mode can be achieved further with low power consumption.

Figure 1:
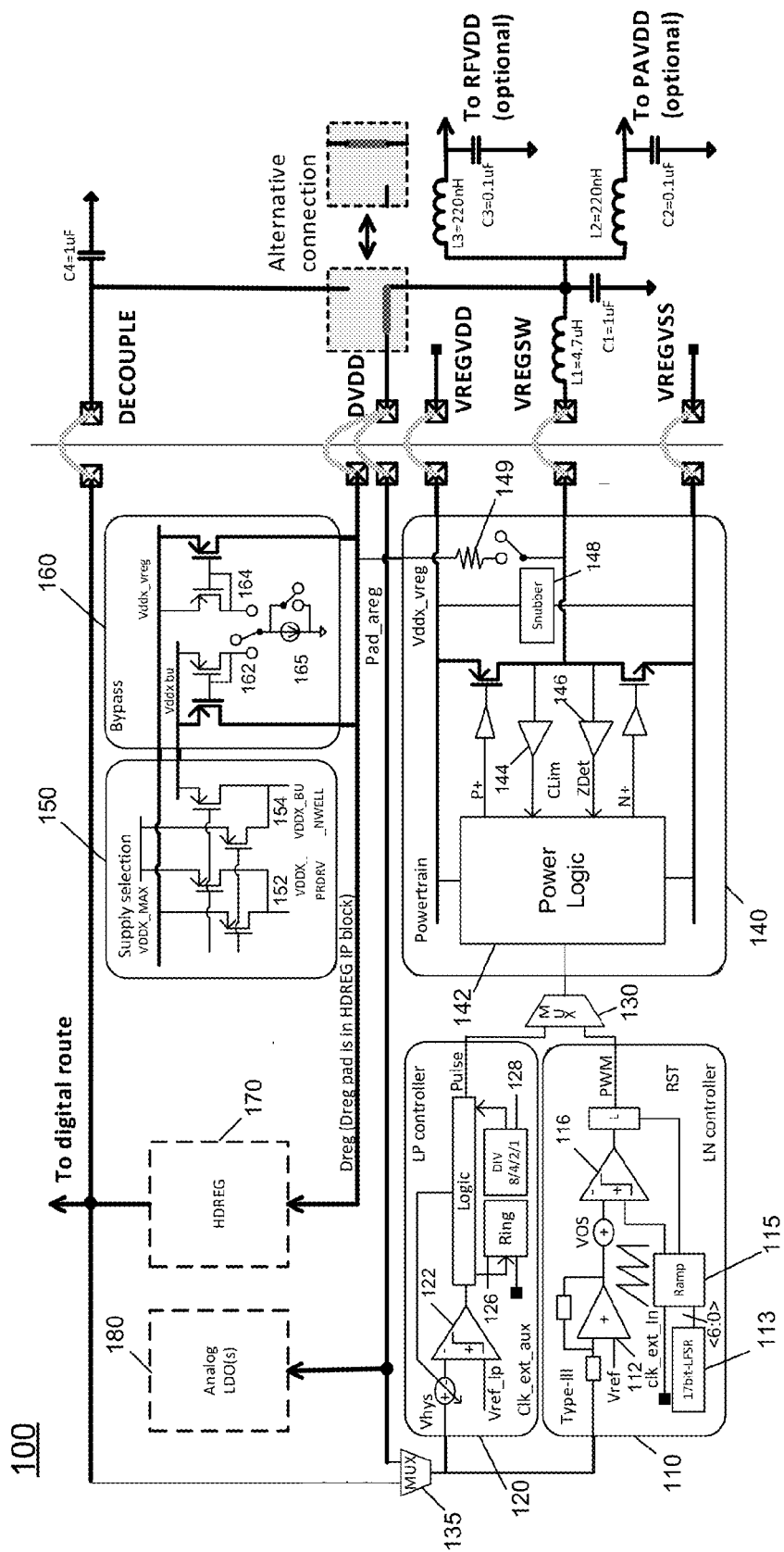
FIG. 1 is a block diagram of a voltage regulator in accordance with an embodiment.

Referring now to FIG. 1, shown is a block diagram of a voltage regulator in accordance with an embodiment. In the example shown in FIG. 1, regulator 100 is an on-chip DC-to-DC voltage regulator, which may be implemented as a DC-DC buck converter. More specifically, voltage regulator 100 provides for different control techniques to enable efficient operation in both active and low power modes of the chip (or at least portions of the chip that are powered by the voltage regulator). In some cases, this regulator may provide high efficiency over a wide range of loads, e.g., ranging from micro-ampere to milli-ampere ranges (e.g., 1 µA-200 mA). To this end, voltage regulator 100 includes multiple controllers, with each controller configured to control operation of the voltage regulator in a particular power mode. More specifically, voltage regulator 100 includes a first controller 110, referred to herein as a low noise controller, configured to provide for control of the voltage regulator in an active mode. In turn, a second controller 120, referred to herein as a low power controller, is configured to provide control of the voltage regulator in a low power mode.

As illustrated, controllers 110 and 120 couple through a multiplexer 130 to provide control to a power train 140 of the voltage regulator. In general, power train 140 receives an incoming voltage from an off-chip power source and controls the provision of a regulated voltage by control of a given one of controllers 110 and 120 (in an embodiment, only one controller controls power train 140 at a time). In turn, a corresponding regulated voltage is output from power train 140 and can be provided to various circuitry on-chip. As seen, a digital regulated voltage may be provided to one or more other on-chip regulators 170 that in turn provide a regulated voltage to one or more digital logics of the chip. In turn, via one or more analog low dropout (LDO) regulators 180, one or more regulated voltages may be provided to analog circuitry of the chip. In addition, a feedback signal corresponding to the regulated voltage is provided as a feedback input to controllers 110 and 120 via a multiplexer 135.

Still with reference to FIG. 1, a supply selection circuit 150 controllably provides selection of an appropriate voltage source, either via a main power source (via a first driver circuit 152) or via a backup voltage from an auxiliary power source (via backup circuit 154). As further seen, a bypass circuit 160 is configured to provide a bypass mode based on operating conditions. As illustrated, bypass circuit 160 includes a bypass current mirror 162, a main source current mirror 164 and a switch circuit 165 to select the appropriate source of power. More specifically, a bypass mode allows voltage regulator 100 to be bypassed, for example, when the incoming supply is too low for efficient operation. In bypass mode, the DC-DC input supply is internally connected directly to its output through a low resistance switch. Bypass mode also supports inrush current limiting to avoid dropping the input supply due to excessive current transients.

Note that to provide control signals to effect desired operation in different power modes (and with respective power sources), a controller (not shown for ease of illustration in FIG. 1) may be present on chip and may provide control signals to various circuits and selectable elements of voltage regulator 100. In an embodiment, the controller is a microcontroller, digital state machine, or other control circuit, which may be configured to execute instructions stored in a non-transitory storage medium to provide control of the voltage regulator, including switching of controllers 110 and 120 and appropriate pre-charge of one or more of controllers 110 and 120.

As further illustrated, voltage regulator 100 may regulate one of multiple possible output supplies with appropriate connections from VregSw. For example, two alternative output-supply connections are shown: either (1) to DVDD via L1/C1 or (2) to DECOUPLE via L1/C4 are shown. Also, optional connections to PAVDD and RFVDD via L2/C2 and L3/C3 are indicated.

FIG. 1 further provides a high level view of different components of voltage regulator 100. Specifically, low noise controller 110 includes a first operational amplifier (op-amp) 112 and a second comparator 116. Op-amp 112 is configured to compare the feedback signal received with a reference voltage. As seen, a type-III loop stability compensation network couples in feedback between an output and a first input terminal of op-amp 112. In various embodiments, compensation network may provide a wide compensation range (e.g. between approximately 1-10 µF with a 4.7 µH coupled inductor). The resulting comparator signal is provided to comparator 116, which in an embodiment may be configured as a pulse width modulated (PWM) comparator. Comparator 116 is configured to receive the comparator signal coupled to a first input terminal (having an offset voltage). In turn, this first input is compared to a second input received via a second input terminal, which in an embodiment may be a sawtooth waveform generated in a ramp generator 115 (in turn fed by a signal source, which in the embodiment shown is a linear feedback shift register (LFSR) 113). In various embodiments, ramp generator 115 may provide a controllable ratio of the its output (namely a ramp voltage) to a supply voltage. As one example, a fixed ratio of the ramp voltage to VDD may be set at 1:6.

The PWM output is provided as a control signal to power train 140 (when enabled as determined by multiplexer 130). As shown, PWM comparator 116 has a built-in voltage offset. In different embodiments, this comparator may be programmable for a selected duty cycle between a maximum duty cycle limit and a minimum duty cycle limit. PWM comparator 116 thus compares a sawtooth waveform with an output of the compensator to adjust a duty cycle (D) of the PWM waveform. The PWM waveform passes through power train 140 to regulate the DCDC output voltage to Vreg=D*Vdd, when in a continuous conduction mode (CCM).

In turn, low power controller 120 includes a hysteretic comparator 122 configured to compare the fed-back sensed voltage of the DC-DC output (Vreg via multiplexer 135) to a low power reference voltage (Vref_lp). The resulting comparator output of comparator 122 is provided to a logic circuit 124 that in turn generates a pulse output as a control signal provided to power train 140, when enabled by multiplexer 130. As further seen, a ring oscillator 126 that in turn drives logic 124 and a divider circuit 128 to provide an appropriate clock signal to logic 124. Hysteric comparator 122 continuously monitors the DC-DC output Vreg. When Vreg is detected below a low threshold (vthl), low power controller 110 outputs a high duty cycle clock (e.g., 90%) that passes through power train 140 to pump up Vreg. When Vreg is detected higher than a high threshold, vthh (vthh>vthl), low power controller 110 disables the clock and power train 140 to save power. Output voltage Vreg in low power mode thus varies between vthl and vthh, and the hysteresis is targeted as 100 mV, in an embodiment. To allow smooth transition between low noise mode and low power mode, the target output voltage in low noise mode is same as the low threshold vthl in the low power mode.

As further illustrated in FIG. 1, power train 140 includes a power logic 142, configured to receive the control signal (from either of low noise controller 110 or low power controller 120) and perform control operations with regard to power metal oxide semiconductor field effect transistors (MOSFETs) P1 and M1 coupled between a voltage rail and a ground rail. Power logic 142 is configured to perform non-overlap, PFET soft-on, continuous conduction mode (CCM) and discontinuous conduction mode (DCM), based on the received control input and incoming control signals from a current limiter 144 and a zero detector 146 coupled to a common node N1 in turn coupled to the drain terminals of P1 and M1. Current limiter 144 may be a high side current limiter to operate over a wide range of programmable current limits. The high side current limiter threshold is programmable and can have cycle-to-cycle current limit on forward inductor current and send an interrupt to firmware. The firmware can adjust the power device drive strength to optimize power efficiency. In turn, zero detector 146 may provide for low side zero detection for adaptive DCM/CCM. Zero detector 146 is programmable and can have cycle-to-cycle current limit on reverse inductor current from Vsw to Vss_Vreg for safety purposes. When the threshold is zero, it implements DCM.

More specifically, in an embodiment current limiter 144 detects the forward inductor current from VregVdd to VregSw through P1, and disables P1 and turns on M1 for the remaining switching cycle if the forward inductor current is higher than a given threshold. For the next switching cycle, P1 turned on again and current limiter 144 continues to detect the current. This is so-called cycle-to-cycle current limit control. Zero detector 146 detects the reverse inductor current from VregSw to VregVss, and disables M1 for the remaining switching cycle if the reverse inductor current is higher than another threshold. The reverse inductor current then charges up parasitic capacitors in the VregSw node. If the VregSw voltage is high enough, the reverse inductor current can flow through the P1 body diode back to the input supply VregVdd. For the next switching cycle, M1 can be turned on again and zero detector 146 continues to detect the current.

Logic 142 takes either a PWM signal from controller 110 or pulses from the controller 120 and drives P1 and M1 using proper dead-time control. Power train 140 can switch in both forced CCM mode and load-adaptive CCM/DCM mode. Load-adaptive CCM/DCM mode has superior efficiency in light load, whereas forced CCM mode provides the best transient response and noise control when the chip is active. Current limiter 144 is designed to protect P1 from large transient currents. Whenever a current overload is detected, the switching logic advances the transition from P1 to M1 and optionally sends an interrupt signal to the controller. Zero detector 146 is used in DCM mode. When M1 is on and zero voltage is detected across M1, power logic 142 turns M1 off to prevent reverse current. Zero detector 146 can be disabled to enable forced CCM mode. Zero detector 146 can also be configured as a programmable reverse current limiter. A snubber circuit 148 couples between the power rails, and a damper circuit 149, which may be implemented with a switch and resistance, couples between the regulated switch voltage line and the regulated voltage output. Understand while shown at this high level in the embodiment of FIG. 1, many variations and alternatives are possible.

Figure 2:
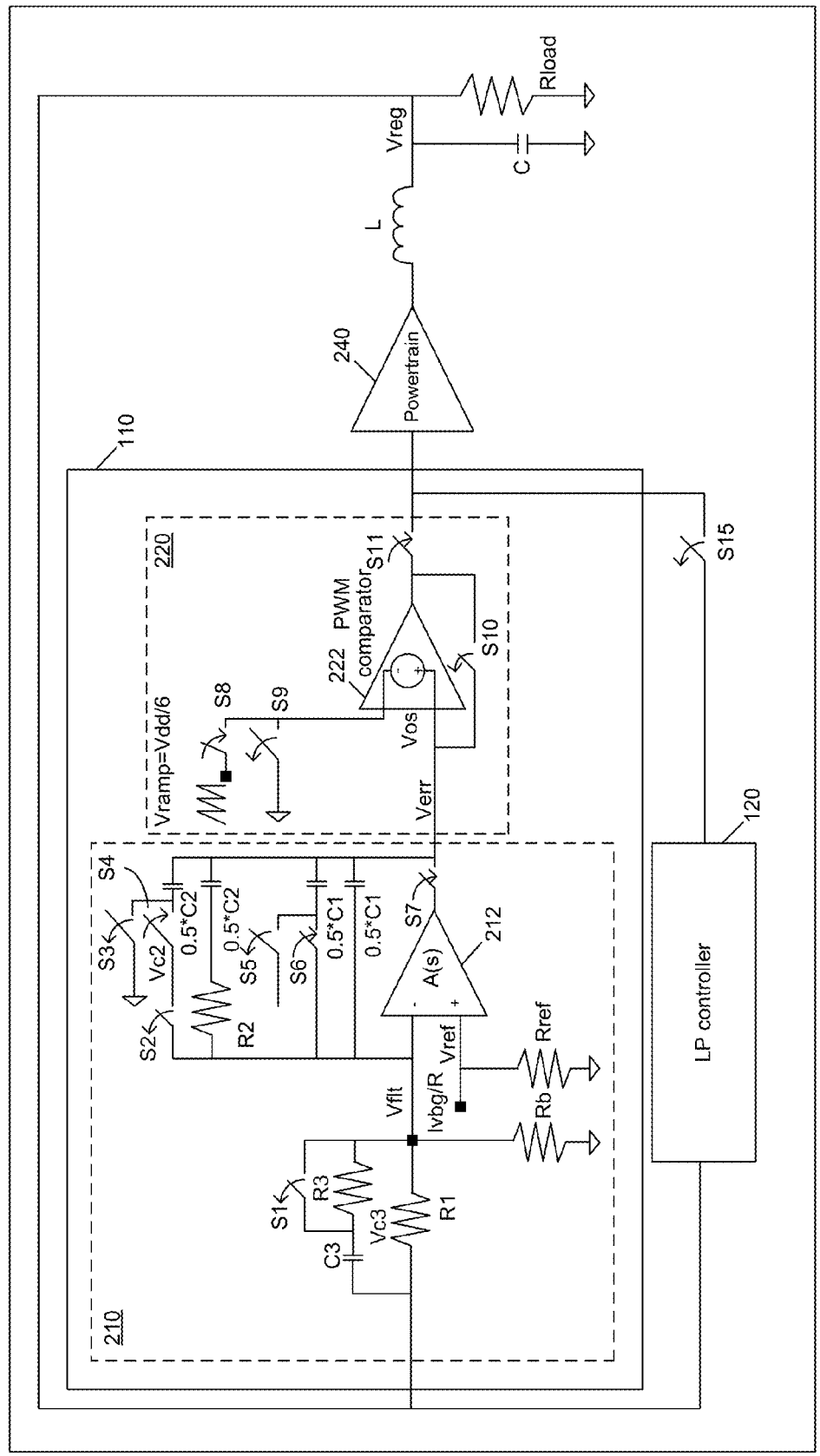
FIG. 2 is a schematic diagram of further details of a voltage regulator in accordance with an embodiment.

Referring now to FIG. 2, shown is a schematic diagram of further details of a voltage regulator in accordance with an embodiment. In the example of FIG. 2, voltage regulator 200 includes controllers 110 and 120, such as discussed above with regard to FIG. 1 that are switchably connected to a power train 240 that generates a regulated voltage to provide to a load (not shown) via an inductor L and a capacitor C.

More specifically FIG. 2 shows details of low noise controller 110 that is configured to provide a pre-charge technique for CCM mode that enables a fast wakeup of this controller when control is to change from low power mode to low noise mode (such as when one or more circuit blocks provided with a regulated voltage from the voltage regulator switch from a low power state to an active state). To this end, embodiments provide a pre-charge technique in which the low noise controller is considered to be a black box having known memory elements (e.g., capacitors and inductances). That is, initial voltages on capacitors C1-C3 represent the network initial states and may slow down transient response during mode transition if they are not at a correct voltage level, realized as described herein. If Vreg is at the targeted voltage, and C1-C3 are pre-charged to target voltages, the low noise mode compensator of low noise controller 110 can avoid slewing/settling from incorrect initial values differing substantially from the target voltages, and therefore can quickly settle to target states.

More specifically in FIG. 2, pre-charge circuitry is provided to enable, upon wakeup, various voltage levels at different locations within low noise controller 110 to be at or substantially close to correct operating voltage levels. Thus there is a fast settle to target states in low noise controller 110.

At a high level, low noise controller 110 includes a first comparator circuit 210 and a second comparator circuit 220 to provide as an output a control signal, which in an embodiment is a PWM control signal, to power train 240. As illustrated, first comparator circuit 210 is configured as a compensator and includes a comparator 212 having a first input terminal coupled to receive the feedback voltage (represented as Vflt in FIG. 2). A type III compensation network is coupled in feedback between the output of comparator 212 and this first input terminal. As shown, this RC network may be switchably controlled to provide a pre-charge technique to enable a fast wake up. As seen, two parallel-connected capacitors C1 and C2 are implemented as half-strength capacitors to provide appropriate pre-charging as described herein. In an embodiment, capacitors C1 and C2 may be implemented as multiple fractional units, where the fractional units can be connected in parallel, or split with different terminals tied to appropriate voltages (ground, value proportional to regulated output, or comparator/op-amp offset voltages) to effect pre-charging. In addition, a resistance R2 couples in series to one of half capacitors C2.

As further illustrated, parallel resistors R1 and R3 couple to this first input node, along with another capacitor C3. Note the presence of a bias resistance Rb also coupled to this first input terminal. In turn, a second input terminal to comparator 212 is configured to receive a reference voltage Vref, which in an embodiment may be generated using a bandgap current.

Switches S1-S7 can be controlled during pre-charging to enable predetermined voltages to be stored on the capacitors. Note that the direction of the arrow of each of the switches indicates the direction of switching at a conclusion of the pre-charge period. Stated another way, each of these switches may be at an opposite state to the arrow direction during the pre-charging period. In this way, an appropriate target feedback voltage may be provided to the first input terminal of comparator 212 when low noise controller 110 is enabled after a low power period.

Still with reference to FIG. 2, second comparator circuit 220 includes a PWM comparator 222. Note that the control of switches S8-S11 during a pre-charging period may be in opposite polarity to the direction of the arrows associated with these switches, which thus indicate the direction of switch operation at a conclusion of the pre-charge period. After pre-charging, which is realized in part by provision of an offset voltage Vos from PWM comparator 212 to the type-III network, an appropriate ramp voltage is provided by way of switch S8 to the first input terminal of PWM comparator 222 during normal operation.

Note further that when low noise controller 110 is enabled and after a settling period, switch S15 opens and switch S11 closes such that control is provided from low noise controller 110 rather than low power controller 120. Using an embodiment as in FIG. 2, the need for an extra reference for performing pre-charging is avoided. In addition, no extra buffers are needed and the pre-charging technique can be implemented using a small number of switches as illustrated.

In an embodiment, at the conclusion of the wakeup period (and pre-charge), the feedback voltage (equally Vreg) may be equal to 3Vref. At this same time period, Verr=Vos+Vramp×Vreg/Vdd, which further equals Voffset+Vref/2. Capacitors can be divided up into fractional units (e.g., in FIG. 2, C1 and C2 are each divided into half units), and terminals of the fractional units can be forced to appropriate voltages (e.g., ground, Vos, or VREG/3 in FIG. 2). For each of C1 and C2, denoting the top/bottom half-units by C1+/− and C2+/−, respectively, C1+ and C2+ are pre-charged to Vos, while C1− and C2− are pre-charged to Vos-VREG/3. In addition, C3 is pre-charged to 2*Vref.

Figure 3:
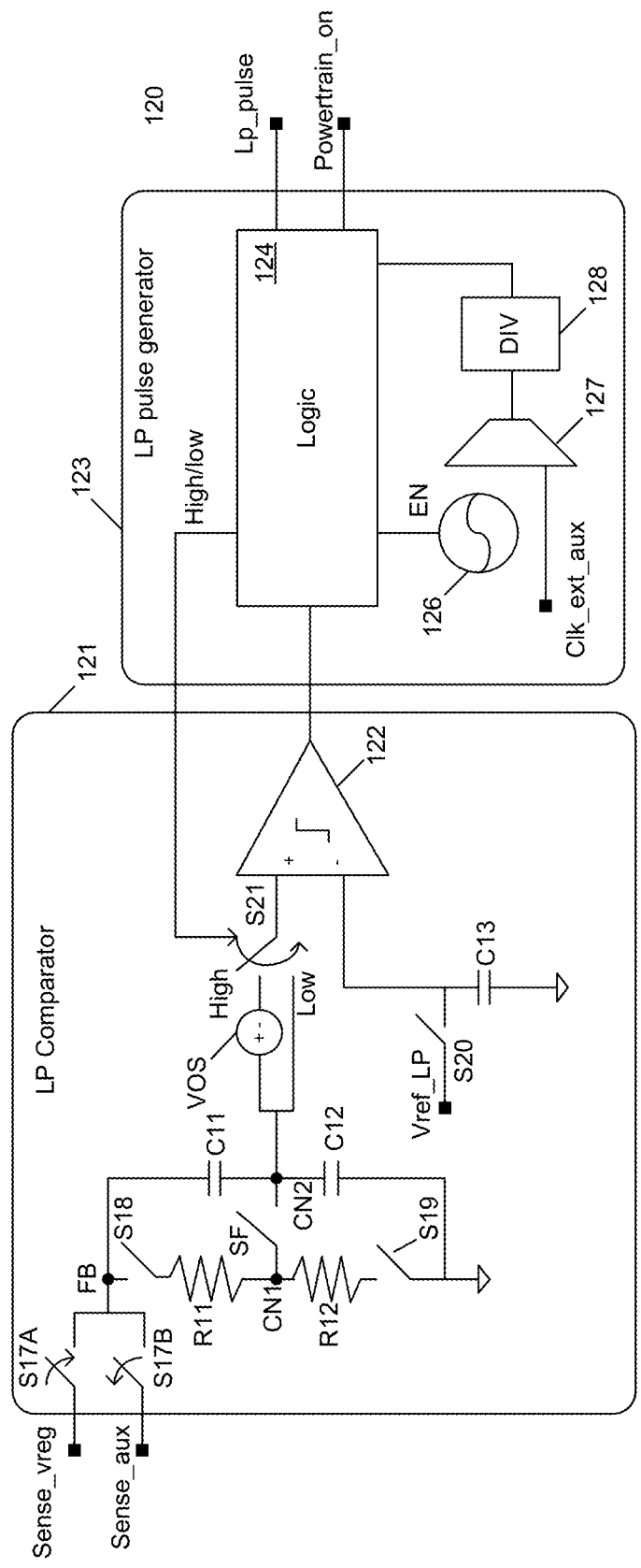
FIG. 3 is a schematic diagram of further details of a low power controller in accordance with an embodiment.

Referring now to FIG. 3, shown is a schematic diagram of further details of a low power controller in accordance with an embodiment. In the embodiment shown in FIG. 3, further details of low power controller 120 (also shown in FIGS. 1 and 2) are seen. A low power comparator 121 may be implemented as a low power hysteretic comparator that provides a continuous-time comparator. To generate a feedback voltage, the incoming regulated voltage (or an auxiliary sense signal) is coupled through switch(es) S17A and S17B through a RC network to a first input terminal of hysteretic comparator 122.

As seen, the RC network is formed of a duty cycled resistive divider formed of resistors R11 and R12, switchably coupled between a feedback node FB and a ground node (note that resistors R11 and R12 are coupled in series at a first common node CN1, in turn switchably coupled to a second common node CN2 via switch SF). The duty cycling of these resistors by way of switches S18 and S19 provides an appropriate voltage at the feedback input. In turn, a capacitor divider is formed of capacitors C11 and C2.

To provide hysteresis, an offset voltage Vos is selectively coupled to the first input terminal. Note that depending on whether a pulse is active or not, the control of switch S21 enables either a high or low feedback signal to couple to the first input terminal. In turn, a low power reference voltage is coupled to the second input terminal via switch S20, along with a capacitor C13. Note that the bias of hysteretic comparator 122 may be programmably controlled based on a bias control signal. The switch/capacitor combinations of S18/S19/SF/C11/C12 and S20/C13 may be configured to act as sample/hold networks.

Still with reference to FIG. 3, low power pulse generator 123 may be configured substantially as shown in FIG. 1 to generate a pulse control signal to the power train. In the embodiment shown, ring oscillator 126 provides a clock signal through a multiplexer 127 to divider 128 than in turn controls logic 124 to generate this pulse. Note that in an embodiment, pulse generator 123 is only enabled during pumping operations.

Figure 4:
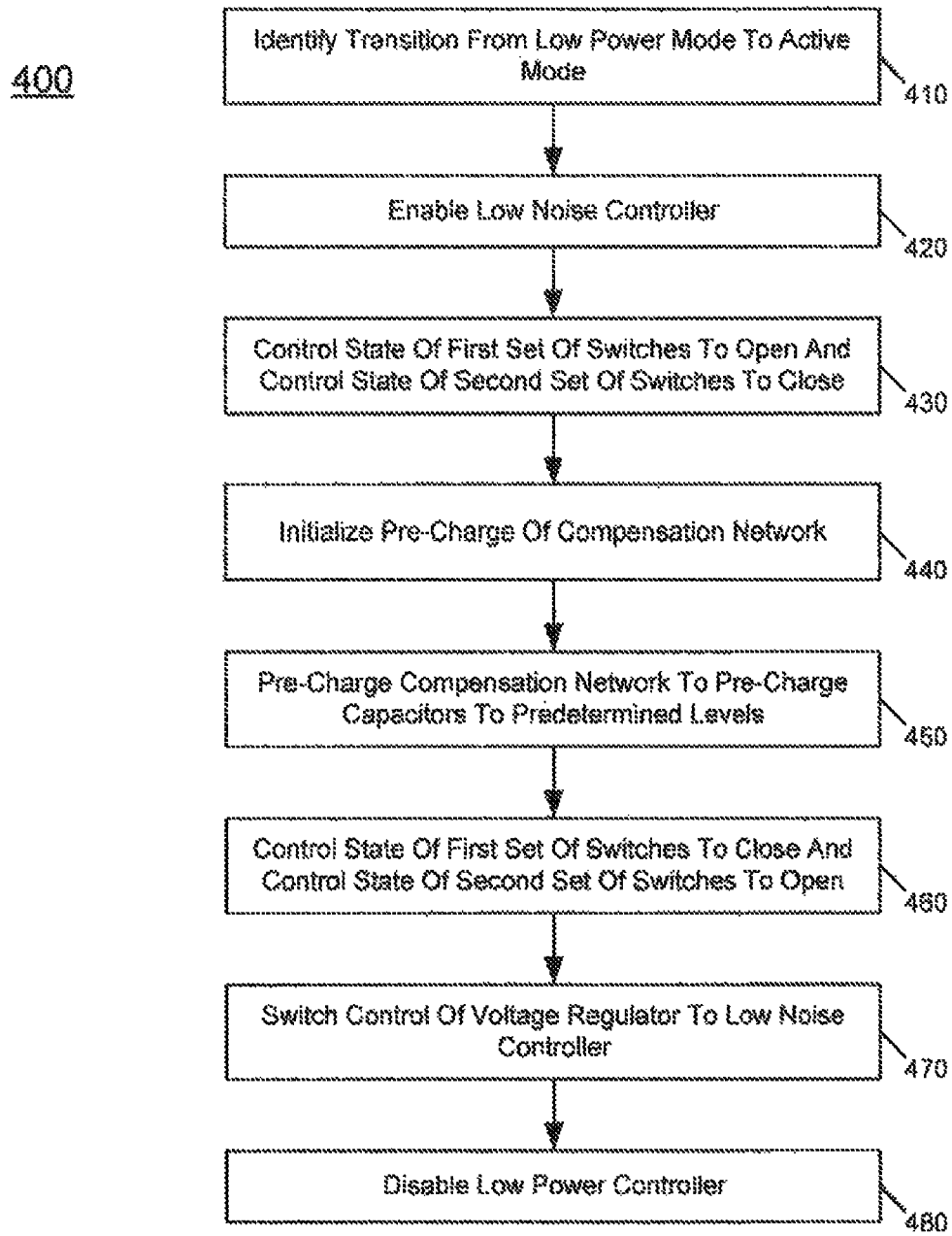
FIG. 4 is a flow diagram of a method of pre-charging a controller in accordance with an embodiment.

Referring now to FIG. 4, shown is a flow diagram of a method of pre-charging a controller in accordance with an embodiment. More specifically, method 400 of FIG. 4 may be implemented by a controller such as a microcontroller that provides control signals to various components of the low noise controller and other portions of a voltage regulator to perform the control operations described to enable the pre-charge and voltage regulator operation set forth.

As illustrated, method 400 begins by identifying a transition from a low power mode to an active mode for a system, such as a low power sensing system (block 410). This identification may be responsive to receipt of an interrupt signal, a request signal from a given logic to power up, a timer expiration or so forth. Responsive to receipt of this signal in the microcontroller, the microcontroller enables the low noise controller (block 420). That is, when the system is in a low power state, control of the voltage regulator to maintain certain state and wakeup capabilities for the system may be realized by providing a low power operating voltage under control of the low power controller, and the low noise controller is disabled.

Next at block 430, different sets of switches within the low noise controller can be controlled to be placed into respective open and closed states. More specifically, various switches as described above can be controlled by way of control signals communicated to the switches to be either closed or open as desired to enable appropriate pre-charging to occur. After these switches are controlled, a pre-charge period occurs in which pre-charging of a compensation network is initiated (block 440). During this pre-charge period (generally block 450), the compensation network may be pre-charged to place predetermined voltage levels on various capacitors of the compensation network. In some cases this pre-charge period may be for a predetermined amount of time, as determined during design. In other cases, the voltage levels of one or more of the capacitors can be measured and a determination can be made as to whether such voltages have attained a desired level to enable conclusion of the pre-charge period. Next at block 460, the switches as described can be controlled in the opposite direction of their pre-charge control.

When the pre-charge period concludes with the desired voltage levels on the capacitors of the compensation network, control passes to block 470 where control of the voltage regulator may be switched to the low noise controller. In some cases, one or more physical switches may be controlled to enable control signals to be provided from the low noise controller to the voltage regulator and to similarly disable control signals from being provided by the low power controller. Thereafter at block 480, the low power controller itself may be disabled or placed into a low power state to further reduce power consumption. Understand while shown at this high level in the view of FIG. 4, many variations and alternatives are possible.

Figure 5:
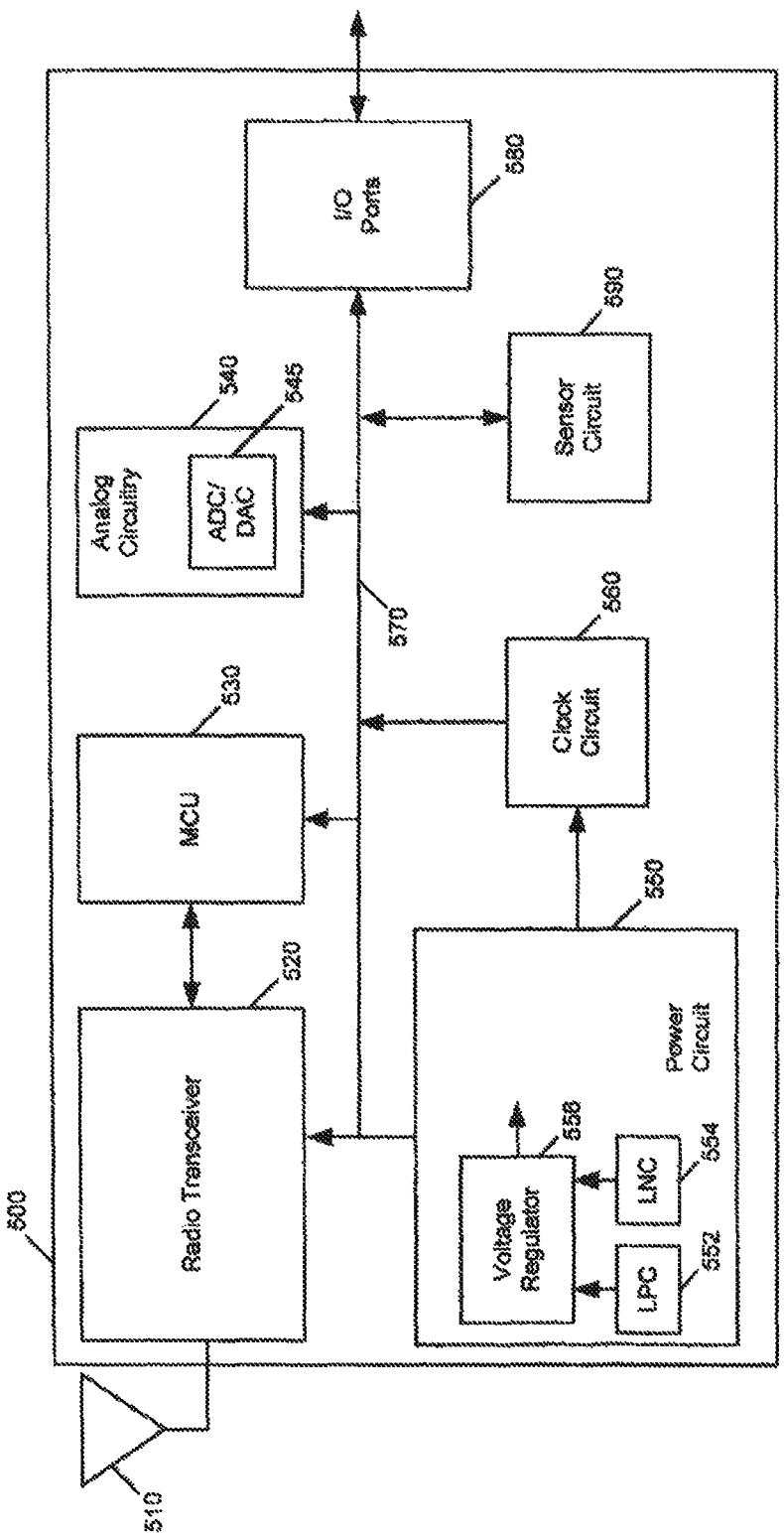
FIG. 5 is a block diagram of an integrated circuit in accordance with an embodiment.

Referring now to FIG. 5, shown is a block diagram of an integrated circuit in accordance with an embodiment. As shown in FIG. 5, integrated circuit 500 may take the form of a microcontroller or other such circuit. As seen, integrated circuit 500 is coupled to an antenna 510, which may provide for transmission and receipt of radio frequency (RF) signals of one or more bands (or in some cases multiple such antennas may be present).

In turn, antenna 510 couples to a radio transceiver 520 which may include one or more signal processing paths to process incoming and outgoing RF signals of the one or more bands. In turn, radio transceiver 520 communicates with an MCU 530, which may include the main processing and control circuitry of the integrated circuit. MCU 530 communicates with additional circuitry, including analog circuitry 540, which may act as an interface to various analog components such as a variety of different off-chip sensors that may couple to integrated circuit 500 via a set of I/O ports 580, and one or more on-chip sensor circuits 590. In the embodiment shown, analog circuitry 540 includes an analog-to-digital/digital-to-analog circuitry (ADC/DAC) 545 to digitize incoming analog signals received from such off-chip sources and to convert to analog form digital information, such as control information to be communicated to off-chip sources. A set of interconnects 570 may couple the various components of the integrated circuit, to provide communication of power, clock and data signals.

Still with reference to FIG. 5, a power circuit 550 includes a voltage regulator 556 which, in an embodiment may be an on-chip DC-DC voltage regulator as described herein. To this end, power circuit 550 further includes multiple controllers to provide control signals to voltage regulator 556, including a low power controller 552 and a low noise controller 554. Such controllers may be as described herein and may be configured to realize fast wakeup of low noise controller 554 when exiting a low power mode. To this end, low noise controller 554 may include a pre-charge circuit as described herein to enable a predetermined state (e.g., of a set of capacitors of a compensation network) to be pre-charged to an appropriate initial state to enable the low noise controller to be activated to begin control operations with an initial state substantially at a target level. Understand while shown at this high level in the illustration of FIG. 5, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a first controller to control a voltage regulator, the first controller comprising:
      a first comparator circuit to compare a first reference voltage to a feedback voltage, the first comparator circuit comprising:
         a first comparator having a first input terminal to receive the feedback voltage and a second input terminal to receive the reference voltage and an output node to output an error signal based on the comparison; and
         a first pre-charge circuit coupled between the first input terminal and the output node, the first pre-charge circuit configured to pre-charge a first portion of a compensation network to a pre-charge level; and
      a second comparator circuit coupled to the first comparator circuit, the second comparator circuit to compare the error signal to a ramp signal and to generate a first control output, the first control output to control a power train of the voltage regulator in a first mode of operation, wherein the first pre-charge circuit comprises:
         at least one first switch controllable to couple a first node of the compensation network to an input terminal of the second comparator circuit;
         at least one second switch controllable to couple a second node of the compensation network to the first input terminal of the first comparator;
         at least one third switch controllable to couple one or more internal nodes of the compensation network to a predetermined voltage.

2. The apparatus of claim 1, further comprising a second controller coupled to the first controller, the second controller comprising a low power controller to control the power train in a second mode of operation, the second mode of operation corresponding to a low power mode of operation and the first mode of operation corresponding to an active mode of operation.

3. The apparatus of claim 1, wherein the first pre-charge circuit is configured to pre-charge a first polarity of a first capacitor and a first polarity of a second capacitor to an offset voltage, the offset voltage to be received from the second comparator circuit.

4. The apparatus of claim 3, wherein the first pre-charge circuit is configured to pre-charge a first portion of a second polarity of the first capacitor and a first portion of a second polarity of the second capacitor to the feedback voltage.

5. The apparatus of claim 4, wherein the first pre-charge circuit is configured to pre-charge a second portion of the second polarity of the first capacitor and a third portion of the second polarity of the second capacitor to the predetermined voltage.

6. The apparatus of claim 5, further comprising a second pre-charge circuit coupled to the first input terminal of the first comparator, wherein the second pre-charge circuit is to pre-charge a third capacitor to the predetermined voltage.

7. The apparatus of claim 2, further comprising a microcontroller configured to enable the first controller responsive to a request of a first circuit to exit a low power state, wherein the microcontroller is to enable the first controller to pre-charge for a pre-charge period and to thereafter disable the second controller.

8. The apparatus of claim 2, wherein the first controller is to control the voltage regulator in a continuous conduction mode and the second controller is to control the voltage regulator in a discontinuous conduction mode, based on one or more of configuration and load condition.

9. The apparatus of claim 2, wherein the second controller comprises:
   a capacitive divider having a first capacitor coupled between a feedback node and a divider node and a second capacitor coupled between the divider node and a first node;
   a resistive divider having a first resistor switchably coupled between the feedback node and a second divider node and a second resistor switchably coupled between the second divider node and the first node; and
   a hysteretic comparator having a first input terminal to be switchably coupled to one of the divider node and a hysteretic voltage node coupled to the divider node and a second input terminal to receive a low power reference voltage and to output a low power comparator signal.

10. The apparatus of claim 9, further comprising a first switch to switchably couple the second divider node to the divider node and a second switch to switchably couple the low power reference voltage to the second input terminal of the hysteretic comparator.

11. The apparatus of claim 9, wherein the second controller further comprises a pulse generator coupled to receive the low power comparator signal from the hysteretic comparator and to output a pulse signal to control the power train, wherein the pulse generator is to be enabled during the second mode of operation when the low power comparator signal indicates that a regulated voltage is less than a first low power reference voltage, to enable a pumping operation.

12. The apparatus of claim 11, wherein the pulse generator is to be disabled during the second mode of operation when the low power comparator signal indicates that the regulated voltage is greater than a second low power reference voltage.

13. A method comprising:
identifying a transition of a device from a low power mode to an active mode;
responsive to identifying the transition, controlling a state of a first set of switches of a first controller of a voltage regulator to be open and controlling a state of a second set of switches of the first controller to be closed;
initiating a pre-charge of a compensation network of the first controller, and pre-charging the compensation network to a predetermined state; and
after pre-charging the compensation network to the predetermined state, causing the first controller to control the voltage regulator in place of a second controller of the voltage regulator.

14. The method of claim 13, wherein pre-charging the compensation network comprises:
placing a first voltage level on a first polarity of a first capacitor and a first polarity of a second capacitor, the first voltage level corresponding to an offset voltage of a second comparator of the first controller;
placing a second voltage level on a first portion of a second polarity of the first capacitor and a first portion of the second polarity of the second capacitor, the second voltage level corresponding to a reference voltage level; and
placing a third voltage level on a second portion of the second polarity of the first capacitor and a second portion of the second polarity of the second capacitor, the third voltage level corresponding to a ground voltage level.

15. The method of claim 13, further comprising pre-charging the compensation network to cause an input voltage coupled to a first input terminal of a first comparator of the first controller to be substantially close to a reference voltage coupled to a second input terminal of the first comparator when the first controller is enabled to control the voltage regulator.

16. The method of claim 13, further comprising controlling the voltage regulator with the second controller in a low power mode, including enabling a pulse generator of the second controller to provide a pulse signal to a power train of the voltage regulator until an output of the voltage regulator exceeds a first threshold, and thereafter disabling the pulse generator until the output of the voltage regulator is less than a second threshold.

17. The method of claim 13, further comprising:
controlling the voltage regulator in a continuous conduction mode via the first controller; and
controlling the voltage regulator in a discontinuous conduction mode via the second controller.

18. An integrated circuit comprising:
a sensor circuit to sense information;
a radio circuit to wirelessly transmit at least some of the sensed information; and
a voltage regulator to provide a regulated voltage to the sensor circuit and the radio circuit, the voltage regulator comprising:
a power train having one or more first power switches to be controllably coupled between a first voltage node and a switching voltage node and one or more second power switches to be controllably coupled between the switching voltage node and a second voltage node, the power train to output the regulated voltage, the power train comprising:
a power logic;
a first current limiter to provide a first current limit signal to the power logic, responsive to a first current from the first voltage node to the switching voltage node exceeding a first threshold level; and
a second current limiter to provide a second current limit signal to the power logic, responsive to a second current from the switching voltage node to the second voltage node being greater than a second threshold level, wherein the power logic is to perform a cycle-to-cycle current limit control based on the first and second current limit signals;
a first controller to control the power train in a first mode of operation corresponding to an active mode of operation, the first controller comprising:
a compensator having a first input terminal to receive the regulated voltage and a second input terminal to receive a reference voltage and an output node to output an error signal based on a comparison, the compensator including a compensation network to be pre-charged to a pre-charge level when the first controller is to be enabled; and
a comparator circuit coupled to the compensator, the comparator circuit to compare the error signal to a ramp signal and to generate a first control output to control the power train in the first mode of operation; and
a second controller to control the power train in a second mode of operation, the second mode of operation corresponding to a low power mode of operation.

* * * * *